United States Patent [19]
Bell et al.

[11] Patent Number: 5,862,129
[45] Date of Patent: Jan. 19, 1999

[54] APPARATUS AND METHOD FOR THE DETECTION AND ELIMINATION OF CIRCULAR ROUTED SS7 GLOBAL TITLE TRANSLATED MESSAGES IN A TELECOMMUNICATIONS NETWORK

[75] Inventors: Ronald B. Bell, Plano; Jeffrey D. Copley, Garland; Thomas L. Hess, Plano, all of Tex.

[73] Assignee: DSC Telecom L.P., Plano, Tex.

[21] Appl. No.: 771,475

[22] Filed: Dec. 23, 1996

[51] Int. Cl.$^6$ ........................................................ H04J 3/12
[52] U.S. Cl. ........................ 370/236; 370/392; 370/385; 370/522; 379/230
[58] Field of Search ................................ 370/235, 236, 370/237, 249, 392, 400, 401, 410, 420, 385, 522, 524; 395/200.15, 200.16, 200.11; 340/825.05; 379/230

[56] References Cited

U.S. PATENT DOCUMENTS

| | | | |
|---|---|---|---|
| 5,321,812 | 6/1994 | Benedict et al. | 395/200 |
| 5,331,637 | 7/1994 | Francis et al. | 370/54 |
| 5,726,979 | 3/1998 | Henderson et al. | 370/254 |

*Primary Examiner*—Hassan Kizou
*Attorney, Agent, or Firm*—Baker & Botts, L.L.P.

[57] ABSTRACT

A method (100, 700, 800) for detecting and eliminating circular routed messages in a telecommunications network includes the steps of receiving a message, and determining a derived destination point code for the received message (102). The derived destination point code is then compared with an originating point code in the message (108). A circular routed message is detected if the derived destination point code is the same as the originating point code. This comparison may be disabled and instead the routing information for routing the message indicated by the derived destination code may be compared with the originating point code (706). Alternatively, the network identifiers indicated by the derived destination point code and the originating point code are compared (806).

19 Claims, 3 Drawing Sheets

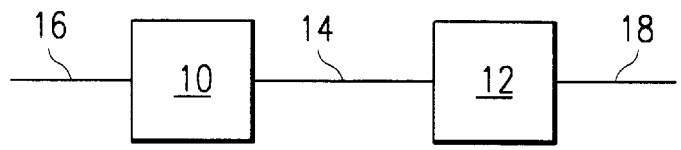
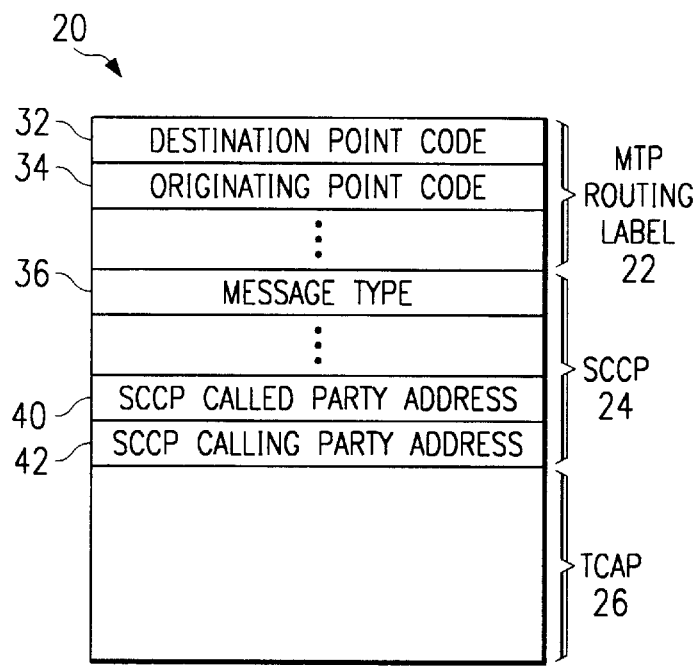
FIG. 1
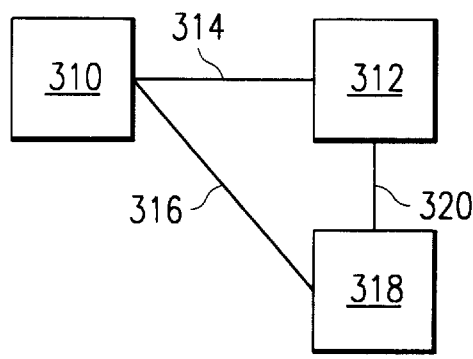
FIG. 2
FIG. 3

APPARATUS AND METHOD FOR THE DETECTION AND ELIMINATION OF CIRCULAR ROUTED SS7 GLOBAL TITLE TRANSLATED MESSAGES IN A TELECOMMUNICATIONS NETWORK

RELATED PATENT APPLICATIONS

This patent application claims the benefit of earlier field U.S. provisional applications, one titled Apparatus and Method for the Detection and Elimination of Circular Routed Signalling System Number 7 Global Title Translated Messages In a Telecommunications Environment, Ser. No. 60/027913, filed on Oct. 11, 1996; and one titled Apparatus and Method for the Detection and Elimination of Circular Routed Signalling System Number 7 Global Title Translated Messages In a Telecommunications Environment Regardless of the SS7 Addressing Method Utilized, Ser. No. 60/028679, filed on Oct. 18, 1996.

This patent application is related to co-pending U.S. patent application, Ser. No. 08/779,966, titled Method for Signalling Connection Control Part Message Loop Prevention, filed on , Dec. 23, 1996,.

TECHNICAL FIELD OF THE INVENTION

This invention is related in general to the field of telecommunications. More particularly, the invention is related to apparatus and method for the detection and elimination of circular routed signalling system number 7 (SS7) global title translated messages in a telecommunications network.

BACKGROUND OF THE INVENTION

The network evolution as a result of the recent telecommunications bill has resulted in the need for global title databases that require complex and precise internetwork coordination to ensure proper delivery of signalling system no. 7 (SS7) signalling connection control part (SCCP) messages such as the unitdata (UDT), unitdata service (UDTS), x-unitdata (XUDT), and x-unitdata service (XUDTS) messages presently defined in ANSI T1.112 titled "Signalling System No. 7 (SS7)—Signalling Connection Control Part (SCCP)". This newly added coordination and complexity has increased burden on network administrators and administration systems. Any inaccuracies during the provisioning process of these databases by the network administrators and administration systems can result in an SCCP message routing continuously back and forth (i.e., circular routing) between network elements without ever reaching the intended final destination.

The current SCCP global title translation (GTT) procedure translates information such as dialed digits into an SS7 routing address called a signalling point code. The signalling point code is used to progress the message to the next network element that is to continue to perform SCCP procedures. SCCP message circular routing occurs when one or more GTT databases are incorrectly provisioned resulting in incorrect routing information being returned when the GTT procedure is performed. The incorrect routing information causes each processed message to be routed repeatedly between network elements without reaching its final destination. This continual circular routing condition will continue indefinitely and may lead to network congestion and possible failure within the network.

SUMMARY OF THE INVENTION

Accordingly, a need has arisen for a solution to address the problems associated with circular routed global title translated messages.

In one aspect of the invention, a method for detecting and eliminating circular routed messages in a telecommunications network includes the steps of receiving a message, and determining a derived destination point code for the received message. The derived destination point code is then compared with an originating point code in the message. A circular routed message is detected if the derived destination point code is the same as the originating point code.

In another aspect of the invention, a method for detecting a circular routed message in a telecommunications network includes the steps of receiving a message, and determining a derived destination point code for the message. A routing information for routing the message to a network element indicated by the derived destination point code is obtained, and a routing information for routing to a network element indicated by the originating point code is also obtained. These two routing information are compared. A circular routed message is detected if the routing information are the same.

In yet another aspect of the invention, a method for detecting a circular routed message in a telecommunications network includes the steps of receiving a message, and determining a derived destination point code for the message. Thereafter, a comparison is made between a first network identifier indicated in the derived destination point code and a second network identifier indicated in the originating point code. A circular routed message condition is detected if the first and second network identifiers are the same.

BRIEF DESCRIPTION OF THE DRAWINGS

For a better understanding of the present invention, reference may be made to the accompanying drawings, in which:

FIG. 1 is a simplified block diagram of a portion of a telecommunications network;

FIG. 2 is a simplified SCCP message showing selected fields;

FIG. 3 is another simplified block diagram of a portion of a telecommunications network;

DETAILED DESCRIPTION OF THE INVENTION

Figure 4:
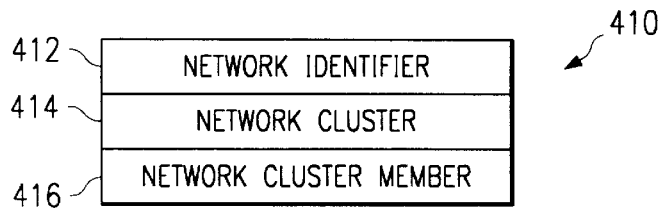
FIG. 4 is a simplified block diagram showing the format of a field within an SS7 message.

Referring to FIG. 1, two network elements 10 and 12 are coupled together with a link set 14. Network element 10 is further coupled to at least one other network element (not shown) with a link set 16, and network element 12 is also coupled to at least one other network element (not shown) with a link set 18. Network elements 10 and 12 may be any network element capable of signalling system number 7 (SS7) signalling connection control part (SCCP) global title translation (GTT) processing (hereafter referred to as GTT processing), such as a signal transfer point (STP) or a service control point (SCP) residing in the telecommunications network.

According to the teachings of the present invention, network elements 10 and 12 are capable of detecting if the SS7 address information obtained as a result of the GTT procedure will result in a circular routing condition. Upon detection of a circular routing condition, network elements 10 and 12 may perform error processing such as terminating the message to keep it from progressing further into the network. Network elements 10 and 12 may also notify maintenance personnel that a circular routing condition has been detected.

In operation, an SCCP message is received over link set 16 by network element 10. Network element 10, upon examination of the received message, determines that the message received requires the GTT procedure. Network element 10 then performs the GTT procedure according to ANSI T1.112 SS7-SCCP.

Referring also to FIG. 2, a simplified exemplary SCCP message format 20 is shown. Message format 20 includes a message transfer part (MTP) routing label 22, an SCCP 24, and a transaction capabilities application part (TCAP) 26. The GTT procedure translates the information in a called party address field 40 in the message into a signalling point code which is used as the derived destination point code (DPC). In this case, the GTT process is referred to as non-final or intermediate GTT in the telecommunications industry since the result of the GTT procedure is the address of the next network element that is to continue performing GTT processing. The derived destination point code from the GTT procedure is placed in a destination point code field 32 of the SCCP message. An originating point code (OPC) field 34 of the message contains the SS7 address of the previous network element that performed or requested GTT processing. Upon completion of GTT processing, originating point code field 34 is replaced with the signalling point code of the current processing network element. The message is then sent to the next network element identified in destination point code field 32.

In some instances, the SCCP called party address 40 may not contain sufficient information to perform the GTT process. In these cases, the GTT process interrogates the transaction capabilities application part 26 to obtain the needed information. Regardless of how the translation information is received, the end result of a normal GTT procedure is a derived destination point code.

The derived destination point code is the SS7 network address that identifies the next network element (or elements) that is to continue to perform SCCP processing. In many cases, the derived destination point code from nonfinal GTT processing may be an alias point code (also known as a capability code). An alias point code provides an additional SS7 address that is used to identify one or more SS7 network elements where SCCP processing is to be performed.

Returning to the scenario shown in FIG. 1, network element 10 performs the non-final GTT procedure and obtains the derived destination point code which in this example is the SS7 address that identifies network element 12. According to the teachings of the present invention, a two step comparison process is performed. Step one of the comparison process may optionally be performed at the discretion of the network provider. Network element 10, when performing step one, compares the derived destination point code with the originating point code field in the received message. A circular routing condition exists if the derived destination point code and the received originating point code identify the same network element address. If the network element SS7 addresses are the same, and this invention is activated for this translation, the message is discarded, ANSI SS7-SCCP error procedures are invoked, and maintenance personnel may be notified.

Step two of the comparison process is performed if the network element SS7 addresses compared in step one are not the same or if step one was not performed. In many network configurations, the result of a non-final GTT will be an alias point code. Step one of the circular route detection will not identify a derived destination point code and originating point code match when the result of a non-final GTT is an alias point code. A second step in the process is thus needed.

As step two of the circular detection process, network element 10 compares, from its routing database, its routing data for routing to the network element identified by the received originating point code with its routing data for routing to the network element identified by the derived destination point code. If a common route is found, and if the common route is not a C-link link set, then network element 10 has detected a circular routing condition.

Referring to FIG. 3 for a definition of a C-link link set and an alias signalling point code, a network element 310 is interconnected with network elements 312 and 318 via link sets 314 and 316, respectively. Additionally, network elements 312 and 318 are interconnected via a link set 320. Network elements 312 and 318 have a common alias signalling point code in addition to their own unique SS7 addresses. In this example, the derived destination point code obtained as a result of non-final GTT processing at network element 310 is an alias signalling point code that addresses both network elements 312 and 318. As part of normal GTT processing, the alias signalling point code will be used by network element 310 as the destination point code of the message. Network element 310 may send the message to either network element 312 via link set 314 or to network element 318 via link set 316 using the alias signalling point code. The same SCCP processing will be performed regardless of whether the message is received by either network element 312 or 318.

In FIG. 3, network element 312 and network element 318 are commonly called mated network elements. By definition of mated network elements, network elements 312 and 318 interconnect with other network elements as common redundant network elements. In other words, network elements 312 and 318 contain identical routing databases and interconnections. Link set 320 interconnecting network elements 312 and 318 is defined by the telecommunications industry as a C-link link set since it interconnects two mated network elements.

Referring also to FIG. 4, an exemplary format 410 of a signalling point code is shown. Signalling point code format 410 shown is the format used for all point codes within a message. Per ANSI SS7-MTP T1.111, a signalling point code 410 includes a network identifier field 412, a network cluster identifier field 414, and a network cluster member identifier field 416.

Large networks are identified, per ANSI SS7-MTP T1.111.8, by using just the network identifier field of the signalling point code with a value in the range of six through 254. Small networks are identified, according to ANSI SS7-MTP T1.111.8, by using the network identifier field and the network cluster field of the signalling point code. Small networks are assigned a network identifier field value in the range of one through four. The value of the network cluster field in small networks ranges from one to 254. The network identifier field for signalling groups has the value of five. All three fields of the signalling point code are needed to identify small network blocks.

Referring to FIG. 1 for an alternate method for step two of the comparison process, network element 10 compares the network identification indicated in the received originating point code with the network identification indicated in the derived destination point code to see if the identified networks are the same. Only large and small network identifiers are compared. Small network groups are not compared since, by definition in ANSI SS7-MTP T1.111.8, they contain only network element end points and therefore do not perform non-final GTT. If the two networks identified are equal, then network element 10 may have detected a circular routing condition. In this example, the message would be sent to network element 12 over link set 14 since no matches were identified.

Upon receipt of the message over link set 14 by network element 12, network element 12 interrogates the message to see if the GTT procedure has been requested. Normal GTT procedures are performed on the message at network element 12 if so indicated in the message. Network element 12 performs the non-final GTT procedure and obtains the derived destination point code which in this example is the SS7 address of network element 10. Network element 12 compares the derived destination point code with the originating point code field in the received message. If the originating point code field of the received message is the same as the derived destination point code, a circular routing condition is identified. With this invention is activated for this translation, the message is discarded in this example, ANSI SS7-SCCP error procedures are invoked, and maintenance personnel are notified. The circular message routing condition is thus terminated.

If network element 12 had determined that the derived destination point code and the originating point code field in the received message are not the same, then network element 12 would proceed to step two in the circular route detection process. As step two of the process, network element 12 compares, from its routing database, routing data for routing to the originating point code with the routing data for routing to the derived destination point code. If a common route is found other than a C-link link set, then network element 12 has detected a circular routing condition.

As an alternate method for step two, network element 12 compares the network identification indicated in the received originating point code with the network identification indicated in the derived destination point code to see if these values are equal. If the two network identifications are the same, then network element 12 has detected a circular routing condition. If a circular routing condition has been detected and this invention is activated for this translation, the message is discarded, ANSI SS7-SCCP error procedures are invoked, and maintenance personnel are notified.

Figure 5:
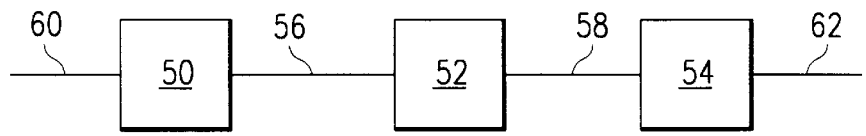
FIG. 5 is another simplified block diagram of a portion of a telecommunications network.

Referring to FIG. 5 for a discussion of through-switched SCCP messages, network elements 50–54 are shown coupled together via link sets 56 and 58. Network element 50 is further coupled to another network element (not shown) by a link set 60, and network element 54 is coupled to another network element (not shown) by a link set 62. Network element 50 performs the non-final GTT procedure resulting in a derived destination point code of network element 54. Since, in this example, no circular routing condition was detected at network element 50, network element 50 addresses the message to network element 54 and sends the message over link set 56. Network element 52 receives the message on link set 56 and determines that the message is addressed to network element 54. Network element 52 sends the message over link set 58 to network element 54.

Upon receipt of the message, network element 54 interrogates the message and determines that non-final GTT procedures are required. Network element 54 performs the non-final GTT procedure and obtains the derived destination point code which is an SS7 address for network element 50 due to incorrect database provisioning. Network element 54 compares the derived destination point code with the originating point code field in the received message. In this example, the originating point code field of the received message refers to network element 50 which is the same value obtained from the GTT procedure. A circular routing condition is thus identified. With this invention activated for this translation, the message is discarded, ANSI SS7-SCCP error procedures are invoked, and maintenance personnel are notified. The message circular routing condition is thus terminated.

As another example, if network element 54 determines that the derived destination point code and the originating point code field in the received message are not the same, for example the derived destination point code returned was an alias point code for network element 50, then network element 54 proceeds to step two in the circular route detection process. If by performing step two a circular routing condition is detected and if this invention activated for this translation, the message is discarded, ANSI SS7-SCCP error procedures are invoked, and maintenance personnel are notified.

Using FIG. 1 for a another scenario, where the present invention is activated in network element 10 but not in network element 12, network element 10 performs the non-final GTT procedure and obtains the derived destination point code which in this example is network element 12. Network element 10 then performs step one and, if necessary, step two of the circular routing detection process. In this example, the message would be sent to network element 12 over link set 14 since a circular routing condition was not detected by network element 10.

Upon receipt of the message over link set 14 by network element 12, network element 12 interrogates the message to see if the non-final GTT procedure is requested. Network element 12 then performs the GTT procedure and obtains the derived destination point code which in this example is an SS7 address for network element 10 due to inaccurate provisioning. Since network element 12 in this example does not have the present invention activated or possibly not deployed, the message is sent back out on link set 14 to network element 10.

Network element 10, upon receiving the message, performs the non-final GTT procedure and obtains the derived destination point code which identifies network element 12 due to inaccurate provisioning. Network element 10 performs step one of the circular route detection procedure which compares the derived destination point code with the originating point code field in the received message. In this example, the originating point code field of the received message is the same as the derived destination point code. A circular routing condition is thus identified. With this invention activated for this translation at network element 10, the message is discarded, ANSI SS7-SCCP error procedures are invoked, and maintenance personnel are notified. The message circular routing condition is thus terminated.

If, in this example, the non-final GTT procedure at network element 10 did not result in a derived destination point code equal to the originating point code, but rather an alias for network element 12, step one of the detection procedure performed at network element 10 would not detect the circular route. However, step 2 of the detection procedure would identify the circular routing condition and terminate the message.

Figure 6:
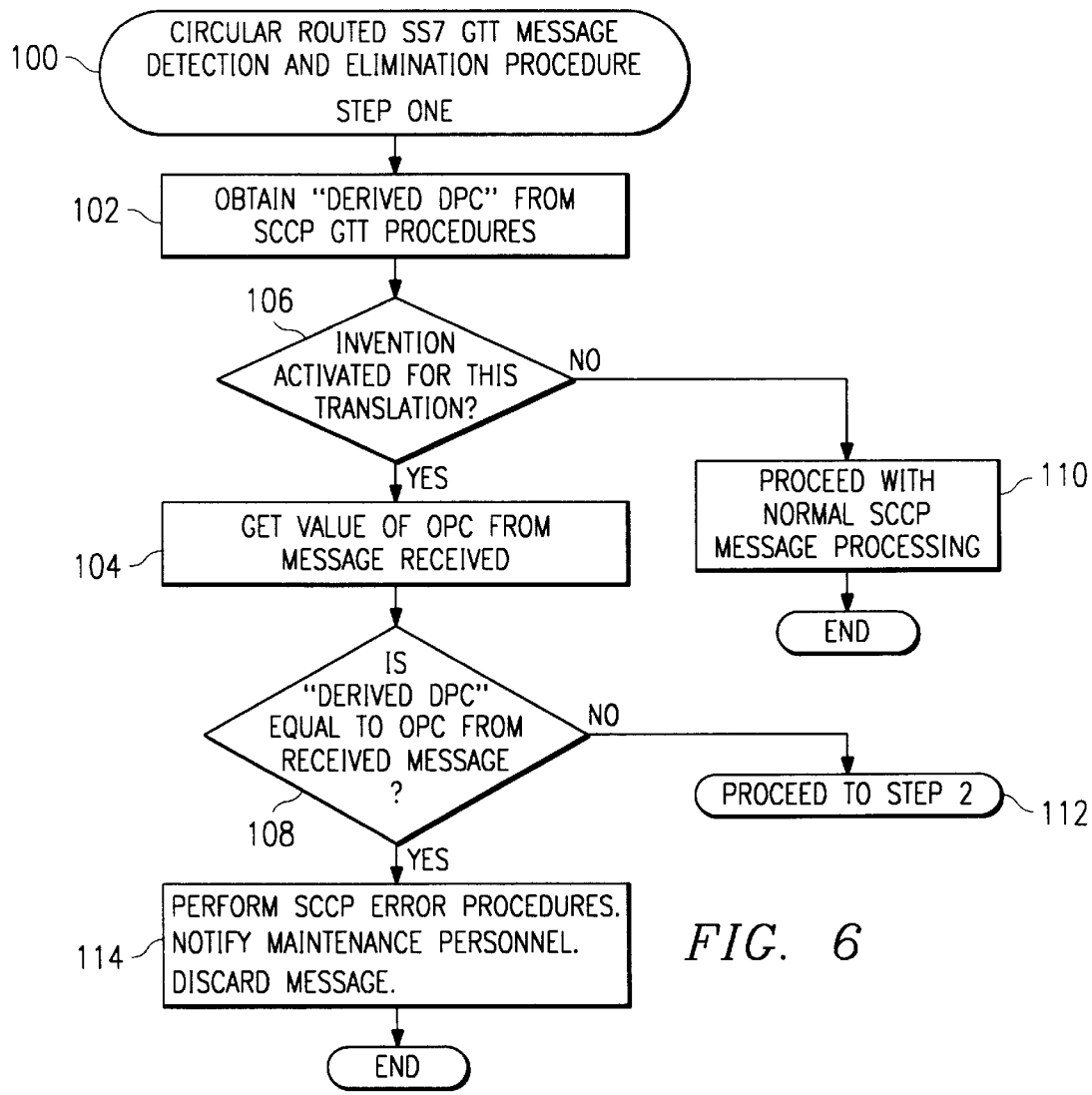
FIG. 6 is a flowchart of an exemplary step one procedure for the detection and elimination of circular routed SCCP GTT processed messages.

A flowchart in FIG. 6 summarizes an exemplary step one circular routing detection and elimination process 100 according to the teachings of the present invention. In block 102, the derived destination point code is obtained as a result of performing the non-final GTT procedure. In block 106, the network element checks to see if the present invention is to be performed on this translation. If this invention is not to be performed, then normal SCCP processing is performed as shown in block 110. If this invention is activated for this translation, then in block 104, the value of the originating point code is obtained from the received message. The derived destination point code is then compared to the originating point code in the received message, as shown in block 108. If these values are equal, a circular routing condition has been detected. As shown in block 114, SCCP error procedures are invoked, maintenance personnel may be notified, and the message is discarded. If the values compared in block 108 are not equal, the procedure proceeds to step two, as shown in block 112.

Figure 7:
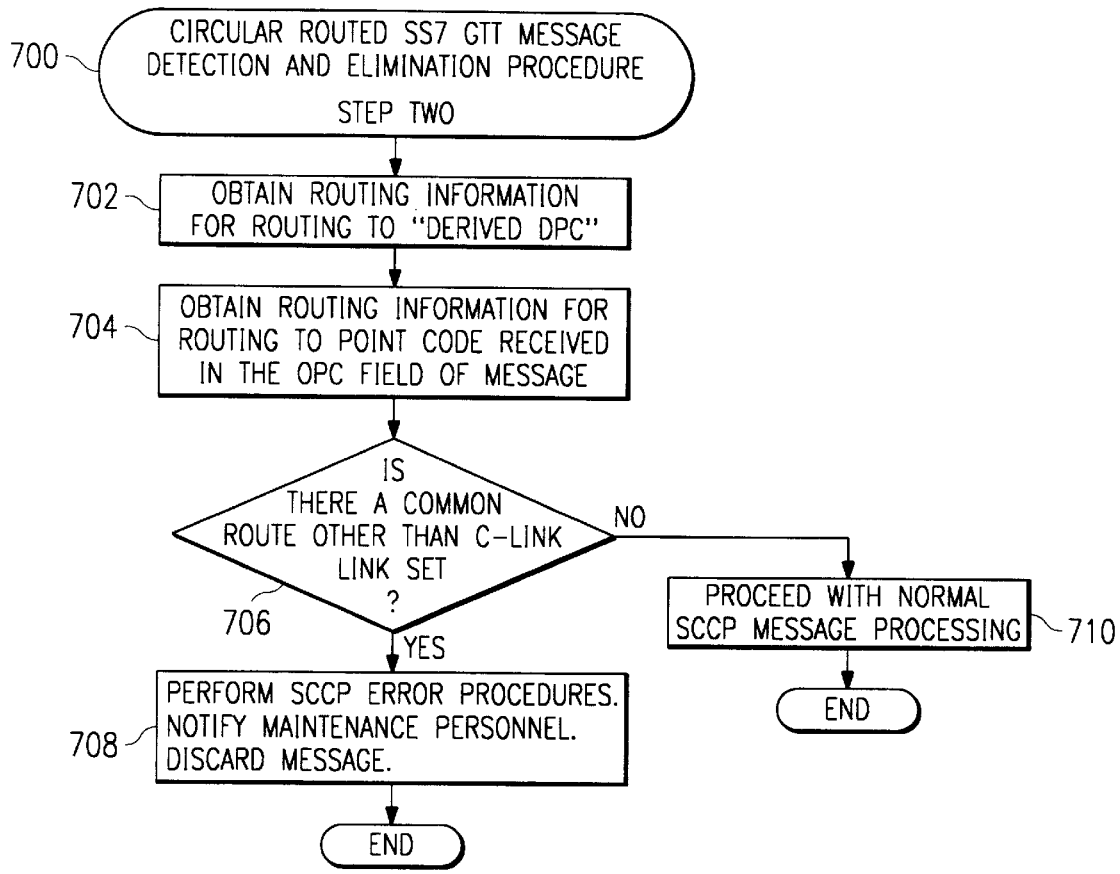
FIG. 7 is a flowchart of an exemplary step two procedure for the detection and elimination of circular routed SCCP GTT processed messages.

A flowchart in FIG. 7 summarizes an exemplary step two of the circular routing detection and elimination process 700 according to the teachings of the present invention. In block 702, the routing information for routing to the derived destination point code is obtained. The routing information for routing to the point code received in the originating point code of the message is obtained as shown in block 704. As shown in block 706, the information received in blocks 702 and 704 are compared to see if there is a common route. If there is a common route other than a C-link link set, a circular routing condition has been detected. As shown in block 708, SCCP error procedures are invoked, maintenance personnel are notified, and the message is discarded. If in block 706 no common non-C-link link set route is identified, then normal SCCP processing is continued, as shown in block 710.

Figure 8:
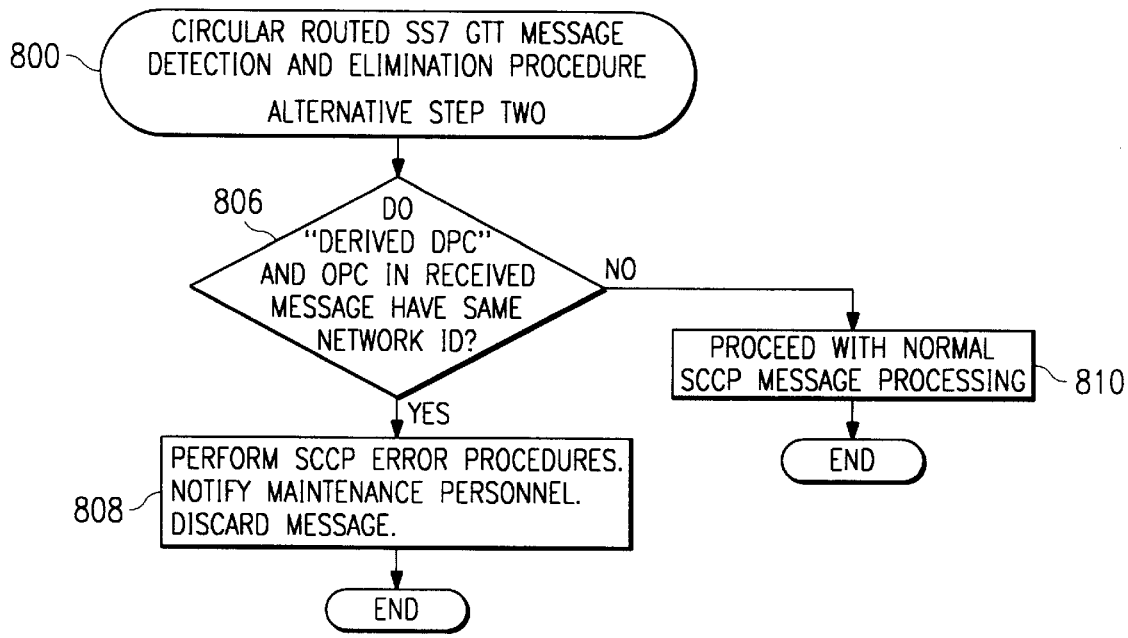
FIG. 8 is a flowchart of an exemplary alternative step two procedure for the detection and elimination of circular routed SCCP GTT processed messages.

A flowchart in FIG. 8 summarizes an exemplary alternate step two of the circular routing detection and elimination process 800 according to the teachings of the present invention. As shown in block 806, the network identification indicated in the received originating point code is compared with the network identification indicated in the derived destination point code to see if these values are equal. If the two networks are the same, then a circular routing condition has been detected. As shown in block 808, the message is discarded, ANSI SS7-SCCP error procedures are invoked, and maintenance personnel are notified. If in block 806 the compared values are not equal, then per block 810 normal SCCP processing is continued.

Constructed and operating in this manner, network elements that are currently in place in the network may be quickly and cost-effectively converted to deploy the present invention to significantly reduce the potential for SCCP GTT circular routed messages. Further, network elements operating in this manner may terminate circular routed messages from other network elements not operating in this manner and performing GTT procedures based on an incorrectly provisioned database.

Although the present invention and its advantages have been described in detail, it should be understood that various changes, substitutions and alterations can be made therein without departing from the spirit and scope of the invention as defined by the appended claims.

What is claimed is:

1. A method for detecting and eliminating circular routed messages in a telecommunications network, comprising the steps of:

receiving a message, the message including destination information and an originating point code identifying a source network element from which the message is received;

determining a derived destination point code for the received message in response to the destination information, the derived destination point code identifying a destination network element to which the message is to be transferred;

comparing the derived destination point code with the originating point code in the message; and identifying the message as a circular routed message in response to the derived destination point code being the same as the originating point code.

2. The method, as set forth in claim 1, further comprising the step of discarding the circular routed message.

3. The method, as set forth in claim 1, further comprising the steps of:

determining that the derived destination point code is not the same as the originating point code;

obtaining a first routing information for routing to the destination network element indicated by the derived destination point code;

obtaining a second routing information for routing to the source network element indicated by the originating point code;

comparing the first and second routing information; and identifying the message as a circular routed message in response to the first and second routing information being the same.

4. The method, as set forth in claim 3, wherein the identifying step includes the step of determining whether the first and second routing information is indicative of a common route other than a C-link link set.

5. The method, as set forth in claim 3, further comprising the step of discarding the circular routed message.

6. The method, as set forth in claim 1, further comprising the steps of:

comparing a first network identification indicated in the derived destination point code with a second network identification indicated in the originating point code; and identifying the message as a circular routed message in response to the first and second network identification being the same.

7. The method, as set forth in claim 6, further comprising the step of discarding the circular routed message.

8. The method, as set forth in claim 1, further comprising the steps of:

determining whether detection of circular routed messages is activated; and proceeding with normal message processing in response to the detection of circular routed messages not being activated.

9. A method for detecting and eliminating circular routed messages in a telecommunications network, comprising the steps of:

receiving an SCCP message, the SCCP message including destination information and an originating point code identifying a source network element from which the message was received;

performing a non-final global title translation and determining a derived destination point code for the received SCCP message in response to the destination information, the derived destination point code identifying a destination network element to which the message is to be transferred;

comparing the derived destination point code with an originating point code in the SCCP message;

identifying the SCCP message as a circular routed message in response to the derived destination point code being the same as the originating point code; and performing a predetermined error processing procedure on the circular routed message.

10. The method, as set forth in claim 9, wherein the step of performing error processing procedure comprises the step of discarding the circular routed message.

11. The method, as set forth in claim 9, further comprising the steps of:

determining that the derived destination point code is not the same as the originating point code;

obtaining a first routing information for routing to the destination network element indicated by the derived destination point code;

obtaining a second routing information for routing to the source network element indicated by the originating point code;

comparing the first and second routing information; and identifying the SCCP message as a circular routed message in response to the first and second routing information being the same.

12. The method, as set forth in claim 11, wherein the identifying step comprises the step of determining whether the first and second routing information is indicative of a common route other than a C-link link set.

13. The method, as set forth in claim 9, further comprising the steps of:

comparing a first network identification indicated in the derived destination point code with a second network identification indicated in the originating point code; and identifying the SCCP message as a circular routed message in response to the first and second network identification being the same.

14. A method for detecting a circular routed message in a telecommunications network, comprising the steps of:

receiving a message, the message including destination information and an originating point code identifying a source network element from which the message was received;

determining a derived destination point code for the message in response to the destination information, the derived destination point code identifying a destination network element to which the message is to be transferred;

obtaining a first routing information for routing the message to the destination network element indicated by the derived destination point code;

obtaining a second routing information for routing to the source network element indicated by the originating point code;

comparing the first and second routing information; and identifying the message as a circular routed message in response to the first and second routing information being the same.

15. The method, as set forth in claim 14, wherein the identifying step comprises the step of determining whether the first and second routing information is indicative of a common route other than a C-link link set.

16. The method, as set forth in claim 14, further comprising the step of discarding the circular routed message.

17. A method for detecting a circular routed message in a telecommunications network, comprising the steps of:

receiving a message, the message including destination information and an originating point code identifying a source network element from which the message was received;

determining a derived destination point code for the message in response to the destination information, the derived destination point code identifying a destination network element to which the message is to be transferred;

comparing a first network identification indicated in the derived destination point code with a second network identification indicated in the originating point code; and identifying the message as a circular routed message in response to the first and second network identification being the same.

18. The method, as set forth in claim 17, further comprising the step of discarding the circular routed message.

19. The method, as set forth in claim 17, further comprising the step of posting a notification message in response to identification of the circular routed message.

* * * * *